(12) United States Patent
Abu-Libdeh et al.

(10) Patent No.: US 8,972,491 B2
(45) Date of Patent: Mar. 3, 2015

(54) CONSISTENCY-BASED SERVICE-LEVEL AGREEMENTS IN CLOUD STORAGE ENVIRONMENTS

(71) Applicant: Microsoft Corporation, Redmond, WA (US)

(72) Inventors: Hussam Abu-Libdeh, Ithaca, NY (US); Marcos K. Aguilera, Mountain View, CA (US); Mahesh Balakrishnan, San Jose, CA (US); Ramakrishna R. Kotla, Sunnyvale, CA (US); Vijayan Prabhakaran, Sunnyvale, CA (US); Douglas Brian Terry, San Carlos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 13/645,511

(22) Filed: Oct. 5, 2012

(65) Prior Publication Data

US 2014/0101225 A1    Apr. 10, 2014

(51) Int. Cl.
*G06F 15/16*    (2006.01)

(52) U.S. Cl.
USPC ............ 709/203; 709/204; 709/205; 709/206

(58) Field of Classification Search
CPC . H04L 41/5096; H04L 67/10; H04L 67/1027; G06F 15/16; G06F 17/30; G06F 11/28
USPC .......... 709/203, 204–206, 217–219, 223–226
See application file for complete search history.

(56) References Cited

U.S. PATENT DOCUMENTS

| | | | |
|---|---|---|---|
| 2010/0122020 A1* | 5/2010 | Sikdar et al. | 711/103 |
| 2010/0192018 A1* | 7/2010 | Aiyer et al. | 714/37 |
| 2012/0109873 A1* | 5/2012 | Xiong et al. | 706/52 |
| 2013/0060933 A1* | 3/2013 | Tung et al. | 709/224 |
| 2013/0325950 A1* | 12/2013 | Laden et al. | 709/204 |

(Continued)

OTHER PUBLICATIONS

Yingyin Zhu et al., "Scheduling with Freshness and Perforamnce Guarantees for Web Application in the Cloud," Jan. 17, 2011, Association for Computing Machinery, ADC '11 Proceedings of the Twenty-Second Australasian Database Conference—vol. 115, pp. 133-142, dl.acm.org/citation.cfm?id=2460413.*

(Continued)

*Primary Examiner* — Ruolei Zong
(74) *Attorney, Agent, or Firm* — Heikki Einola; Judy Yee; Micky Minhas (57) ABSTRACT

An application programming interface is provided that allows applications to assign multiple service-level agreements to their data transactions. The service-level agreements include latency bounds and consistency guarantees. The applications may assign utility values to each of the service-level agreements. A monitor component monitors the various replica nodes in a cloud storage system for latency and consistency, and when a transaction is received from an application, the monitor determines which of the replica nodes can likely fulfill the transaction in satisfaction of any of the service-level agreements. Where multiple service-level agreements can be satisfied, the replica node that can fulfill the transaction according to the service-level agreement with the greatest utility is selected. The application may be charged for the transaction based on the utility of the service-level agreement that was satisfied.

17 Claims, 5 Drawing Sheets

(56) References Cited

U.S. PATENT DOCUMENTS

2014/0006578 A1* 1/2014 Kohn et al. .................. 709/223
2014/0032504 A1* 1/2014 Golab et al. .................. 707/690

OTHER PUBLICATIONS

Yu, et al., "Design and Evaluation of a Conit-Based Continuous Consistency Model for Replicated Services", Retrieved at <<http://pdf.aminer.org/001/117/371/design_and_evaluation_of_a_conit_based_continuous_consistency_model.pdf>>, In Journal of ACM Transactions on Computer Systems, vol. 20, No. 3, Aug. 2002, pp. 44.
Yu, et al., "The Costs and Limits of Availability for Replicated Services", Retrieved at <<http://www.cs.odu.edu/~mukka/cs775s07/papers/availability.pdf>>, In Journal of ACM Transactions on Computer Systems, vol. 24, No. 1, Feb. 2006, pp. 44.
"Reduce Latency and Increase Application Performance Up to 13× With Adaptec maxCache 20 Read and Write SSD Caching Solutions", Retrieved at <<http://www.adaptec.com/nr/pdfs/maxcache_2-0_wp.pdf>>, Jul. 10, 2012, pp. 4.
Armbrust, et al., "SCADS: Scale-Independent Storage for Social Computing Applications", Retrieved at <<http://arxiv.org/abs/0909.1775>>, Jan. 4, 2009, pp. 7.
Sakr, Sherif., "CloudDB AutoAdmin: Declarative Management of Application-Defined SLA for Cloud-Hosted Databases", Retrieved at <<http://research.ict.csiro.au/hail/Abstracts/2012/sherif_sakr>>, Jun. 14, 2012, pp. 2.
Tilgner, Christian., "Declarative Scheduling in Highly Scalable Systems", Retrieved at <<http://amadeus.ifi.uzh.ch/pax/uploads/pdf/publication/1276/a41-tilgner.pdf>>, Mar. 22, 2010, pp. 6.
Kraska, et al., "Consistency Rationing in the Cloud: Pay only when it matters", Retrieved at <<http://www.vldb.org/pvldb/2/vldb09-759.pdf>>, Aug. 24, 2009, pp. 12.
Liu, Changbin., "Research Statement", Retrieved at <<http://www.cis.upenn.edu/~changbl/pubs/research.pdf>>, Jul. 10, 2012, pp. 4.
Al-Shishtawy, et al., "Robust Fault-Tolerant Majority-Based Key-Value Store Supporting Multiple Consistency Levels", Retrieved at <<http://ieeexplore.ieee.org/stamp/stamp.jsp?tp=&arnumber=6121328>>, In Proceedings of IEEE 17th International Conference on Parallel and Distributed Systems, Dec. 7, 2011, pp. 8.
Alonso, et al., "Data Caching Issues in an Information Retrieval System", Retrieved at <<http://citeseerx.ist.psu.edu/viewdoc/download?doi=10.1.1.106.5051&rep=rep1&type=pdf>>, In Journal of ACM Transactions on Database Systems, vol. 15, Issue 3, Sep. 1990, pp. 26.
"Amazon SimpleDB", Retrieved at <<http://aws.amazon.com/simpledb/>>, Jul. 11, 2012, pp. 13.
Anderson, et al., "What Consistency Does Your Key-value Store Actually Provide?", Retrieved at <<http://static.usenix.org/event/hotdep10/tech/full_papers/Anderson.pdf>>, In Proceedings Usenix Workshop on Hot Topics in Systems Dependability, Oct. 3, 2010, pp. 6.
Armbrust, et al., "SCADS: Scale Independent Storage for Social Computing Applications", Retrieved at <<http://arxiv.org/ftp/arxiv/papers/0909/0909.1775.pdf>>, In Proceedings of 4th Biennial Conference on Innovative Data Systems Research, Jan. 4, 2009, pp. 7.
Baker, et al., "Megastore: Providing Scalable, Highly Available Storage for Interactive Services", Retrieved at <<https://grail.cs.washington.edu/education/courses/cse490h/11wi/CSE490H_files/cloud.megastore.pdf>>, In Proceedings of 5th Biennial Conference on Innovative Data Systems Research, Jan. 9, 2011, pp. 12.
Barbara-Milla, et al., "The Demarcation Protocol: A Technique for Maintaining Constraints in Distributed Database Systems", Retrieved at <<http://www.cs.cornell.edu/courses/cs734/2000fa/cached%20papers/bg94a.pdf>>, In Journal of Very Large Data Bases, vol. 3, Issue 3, Jul. 1994, pp. 29.
Belaramani, et al., "PRACTI Replication", Retrieved at <<http://people.cs.umass.edu/~arun/papers/PRACTI.pdf>>, In Proceedings USENIX Symposium on Networked Systems Design and Implementation, May 8, 2006, pp. 14.
Berenson, et al., "A Critique of ANSI SQL Isolation Levels", Retrieved at <<http://arxiv.org/ftp/cs/papers/0701/0701157.pdf>>, In Proceedings of the ACM SIGMOD International Conference on Management of Data, Jun. 1995, pp. 12.
Bermbach, et al., "MetaStorage: A Federated Cloud Storage System to Manage Consistency-Latency Tradeoffs", Retrieved at <<http://www.aifb.kit.edu/images/3/34/MetaStorage_camera-ready.pdf>>, In Proceedings of IEEE International Conference on Cloud Computing, Jul. 4, 2011, pp. 8.
Bermbach, et al., "Eventual Consistency: How Soon is Eventual? An Evaluation of Amazon S3s Consistency Behavior", Retrieved at <<http://www.aifb.kit.edu/images/1/17/How_soon_is_eventual.pdf>>, In Proceedings of the 6th Workshop on Middleware for Service Oriented Computing, Dec. 12, 2011, pp. 6.
Bernstein, et al., "Concurrency Control in Distributed Database Systems", Retrieved at <<http://cgi.di.uoa.gr/~pms515/p185-bernstein.pdf>>, In Journal ACM Computing Surveys, vol. 13, Issue 2, Jun. 1981, pp. 37.
Brewer, Eric., "CAP Twelve Years Later: How the Rules Have Changed", Retrieved at <<http://ieeexplore.ieee.org/stamp/stamp.jsp?tp=&arnumber=6133253>>, In Proceedings of IEEE Computer, vol. 45, Issue 2, Feb. 2012, pp. 7.
Bonvin, et al., "A Self-Organized, Fault-Tolerant and Scalable Replication Scheme for Cloud Storage", Retrieved at <<http://hydrosys.icg.tugraz.at/media_files/socc2010.pdf>>, In Proceedings of the 1st ACM Symposium on Cloud Computing, Jun. 10, 2010, pp. 12.
Calder, et al., "Windows Azure Storage: A Highly Available Cloud Storage Service with Strong Consistency", Retrieved at <<http://sigops.org/sosp/sosp11/current/2011-Cascais/printable/11-calder.pdf>>, In Proceedings of the Twenty-Third ACM Symposium on Operating Systems Principles, Oct. 23, 2011, pp. 15.
Cattell, Rick., "Scalable SQL and NoSQL Data Stores", Retrieved at <<http://www.sigmod.org/publications/sigmod-record/1012/pdfs/04.surveys.cattell.pdf>>, In ACM SIGMOD Record, vol. 39, Issue 4, Dec. 2010, pp. 16.
Chang, et al., "Bigtable: A Distributed Storage System for Structured Data", Retrieved at <<http://people.cs.kuleuven.be/~bettina.berendt/teaching/2010-11-2ndsemester/ctdb/a4-chang.pdf>>, In ACM Transactions on Computer Systems, vol. 26, No. 2, Article 4, Jun. 2008, pp. 26.
Cooper, et al., "PNUTS: Yahoo!s Hosted Data Serving Platform", Retrieved at <<http://www.mpi-sws.org/~druschel/courses/ds/papers/cooper-pnuts.pdf>>, In Proceedings of International Conference on Very Large Data Bases, vol. 1, Issue 2, Aug. 24, 2008, pp. 12.
Cooper, et al., "Benchmarking Cloud Serving Systems with YCSB", Retrieved at <<http://brianfrankcooper.net/pubs/ycsb.pdf>>, In Proceedings of the 1st ACM Symposium on Cloud Computing, Jun. 10, 2010, pp. 12.
Das, et al., "G-Store: A Scalable Data Store for Transactional Multi key Access in the Cloud", Retrieved at <<http://www.cs.ucsb.edu/~sudipto/papers/socc10-das.pdf>>, In Proceedings of the 1st ACM Symposium on Cloud Computing, Jun. 10, 2010, pp. 12.
Daudjee, et al., "Lazy Database Replication with Snapshot Isolation", Retrieved at <<http://www.vldb.org/conf/2006/p715-daudjee.pdf>>, In Proceedings of the 32nd International Conference on Very large Data Bases, Sep. 12, 2006, pp. 12.
Decandia, et al., "Dynamo: Amazons Highly Available Key-value Store", Retrieved at <<http://www.allthingsdistributed.com/files/amazon-dynamo-sosp2007.pdf>>, In Proceedings of Twenty-First ACM SIGOPS Symposium on Operating Systems Principles, Oct. 14, 2007, pp. 16.
Elnikety, et al., "Database Replication Using Generalized Snapshot Isolation", Retrieved at <<http://ieeexplore.ieee.org/stamp/stamp.jsp?tp=&arnumber=1541186>>, In Proceedings of 24th IEEE Symposium on Reliable Distributed Systems, Oct. 26, 2005, pp. 12.
Golab, et al., "Analyzing Consistency Properties for Fun and Profit", Retrieved at <<http://www.hpl.hp.com/techreports/2011/HPL-2011-6.pdf>>, In Proceedings of the 30th Annual ACM SIGACT-SIGOPS Symposium on Principles of Distributed Computing, Jun. 6, 2011, pp. 27.
"Read Consistency & Deadlines: More Control of Your Datastore", Retrieved at <<http://googleappengine.blogspot.com/2010/03/read-consistency-deadlines-more-control.html>>, Mar. 29, 2010, pp. 4.

(56) References Cited

OTHER PUBLICATIONS

Guo, et al., "Relaxed Currency and Consistency: How to Say Good Enough in SQL", Retrieved at <<http://citeseerx.ist.psu.edu/viewdoc/download?doi=10.1.1.108.2077&rep=rep1&type=pdf>>, In Proceedings of the ACM SIGMOD International Conference on Management of Data, Jun. 13, 2004, pp. 12.
Kossmann, et al., "An Evaluation of Alternative Architectures for Transaction Processing in the Cloud", Retrieved at <<http://www.cmlab.csie.ntu.edu.tw/~kenneth/qing2011/paper/1.pdf>>, In Proceedings of the ACM SIGMOD International Conference on Management of Data, Jun. 6, 2010, pp. 12.
Kraska, et al., "Consistency Rationing in the Cloud: Pay Only When it Matters", Retrieved at <<http://www.vldb.org/pvldb/2/vldb09-759.pdf>>, In Proceedings International Conference on Very Large Data Bases, vol. 2, Issue 1, Aug. 24, 2009, pp. 12.
Lakshman, et al., "Cassandra—A Decentralized Structured Storage System", Retrieved at <<http://www.cs.cornell.edu/projects/ladis2009/papers/lakshman-ladis2009.pdf>>, In ACM SIGOPS Operating Systems Review, vol. 44, Issue 2, Apr. 2010, pp. 6.
Lamport, Leslie., "Time, Clocks, and the Ordering of Events in a Distributed System", Retrieved at <<http://cnlab.kaist.ac.kr/~ikjun/data/Course_work/CS642-Distributed_Systems/papers/lamport1978.pdf>>, In Communication of ACM, vol. 21, No. 7, Jul. 1978, pp. 8.
Lloyd, et al., "Don't Settle for Eventual: Scalable Causal Consistency for Wide-Area Storage with COPS", Retrieved at <<http://www.roday.info/pdf/eventual/0.pdf>>, In Proceedings of the Twenty-Third ACM Symposium on Operating Systems Principles, Oct. 23, 2011, pp. 16.
Lomet, et al., "Multi-Version Concurrency via Timestamp Range Conflict Management", Retrieved at <<http://research.microsoft.com/pubs/156414/PID2126227.pdf>>, In Proceedings of 28th IEEE International Conference on Data Engineering, Apr. 1, 2012, pp. 12.
Peng, et al., "Large-scale Incremental Processing Using Distributed Transactions and Notifications", Retrieved at <<http://static.usenix.org/event/osdi10/tech/full_papers/Peng.pdf>>, In Proceedings of the 9th USENIX conference on Operating Systems Design and Implementation, Oct. 4, 2010, pp. 14.
Serafini, et al., "Weak Consistency as a Last Resort", Retrieved at <<http://research.yahoo.com/files/serafini_LADIS_2010.pdf>>, In Proceedings of the 4th International Workshop on Large Scale Distributed Systems and Middleware, Jul. 25, 2010, pp. 6.
Silberstein, et al., "A Batch of PNUTS: Experiences Connecting Cloud Batch and Serving Systems", Retrieved at <<http://www.seas.upenn.edu/~wenchaoz/publication/sherdoop-sigmod11.pdf>>, In Proceedings of the ACM SIGMOD International Conference on Management of Data, Jun. 12, 2011, pp. 12.
Sovran, et al., "Transactional Storage for Geo-replicated Systems", Retrieved at <<http://citeseerx.ist.psu.edu/viewdoc/download?doi=10.1.1.221.2632&rep=rep1&type=pdf>>, In Proceedings of the Twenty-Third ACM Symposium on Operating Systems Principles, Oct. 23, 2011, pp. 16.
Terry, et al., "Session Guarantees for Weakly Consistent Replicated Data", Retrieved at <<http://ieeexplore.ieee.org/stamp/stamp.jsp?tp=&arnumber=331722>>, In Proceedings of 3rd IEEE International Conference on Parallel and Distributed Information Systems, Sep. 28, 1994, pp. 10.
Terry, et al., "Managing Update Conflicts in Bayou, a Weakly Connected Replicated Storage System", Retrieved at <<http://suraj.lums.edu.pk/~cs582s05/papers/06_bayou.pdf>>, In Proceedings of the Fifteenth ACM Symposium on Operating Systems Principles, Dec. 3, 1995, pp. 12.
Terry, Doug., "Replicated Data Consistency Explained Through Baseball", Retrieved at <<http://research.microsoft.com/pubs/157411/ConsistencyAndBaseballReport.pdf>>, In Microsoft Technical Report, Oct. 2011, pp. 14.
Vogels, Werner., "Eventually Consistent", Retrieved at <<http://citeseerx.ist.psu.edu/viewdoc/download?doi=10.1.1.187.8545&rep=rep1&type=pdf>>, In Communications of the ACM, vol. 52, Issue 1, Jan. 2009, pp. 5.
Vogels, Werner., "Choosing Consistency—All Things Distributed", Retrieved at <<http://www.allthingsdistributed.com/2010/02/strong_consistency_simpledb.html>>, Feb. 24, 2010, pp. 4.
Wada, et al., "Data Consistency Properties and the Trade offs in Commercial Cloud Storages: The Consumers Perspective", Retrieved at <<http://www.cidrdb.org/cidr2011/Papers/CIDR11_Paper15.pdf>>, In Proceedings of Fifth Biennial Conference on Innovative Data Systems Research, Jan. 9, 2011, pp. 10.
Wang, et al., "An Application-Based Adaptive Replica Consistency for Cloud Storage", Retrieved at <<http://ieeexplore.ieee.org/stamp/stamp.jsp?tp=&arnumber=5662733>>, In Proceedings of Ninth IEEE International Conference on Grid and Cloud Computing, Nov. 1, 2010, pp. 5.
Wei, et al., "CloudTPS: Scalable Transactions for Web Applications in the Cloud", Retrieved at <<http://ieeexplore.ieee.org/stamp/stamp.jsp?tp=&arnumber=5740834>>, In Proceedings of IEEE Transactions on Services Computing, Special Issue on Cloud Computing, Apr. 5, 2011, pp. 16.
International Search Report & Written Opinion for PCT Application No. PCT/US2013/060204, Mailed Date: Feb. 6, 2014, Filed Date: Sep. 17, 2013, 13 Pages.
Zhu et al., "Scheduling with Freshness and Performance Guarantees for Web Applications in the Cloud", In Proceedings of the Twenty-Second Australasian Database Conference, Jan. 17, 2011, 10 Pages.
Al-Ekram et al., "OSSR: Optimal Single Site Replication", In International Symposium on Parallel and Distributed Processing with Applications, Sep. 6, 2010, pp. 433-441.
Zhang et al., "Transaction Models for Massively Multiplayer Online Games", In 30th IEEE Symposium on Reliable Distributed Systems, Oct. 4, 2011, pp. 31-40.
Song et al., "Utility Adaptive Service Brokering Mechanism for Personal Cloud Service", In Military Communications Conference, Nov. 7, 2011, pp. 1622-1627.

\* cited by examiner

CONSISTENCY-BASED SERVICE-LEVEL AGREEMENTS IN CLOUD STORAGE ENVIRONMENTS

BACKGROUND

Cloud storage services, such as the popular class of "NoSQL" data stores, have been designed to meet the needs of diverse applications from social networking to electronic commerce. Such storage services replicate application data on multiple machines to make it highly available and to improve performance. Many provide a relaxed form of consistency, eventual consistency, in order to achieve elastic scalability and good performance while some strive for strong consistency to maintain the semantics of one-copy serializability. To allow local access and ensure data survivability even during a complete data center failure, many storage systems offer the option of replicating data across different regions of the world, called "geo-replication."

With data being replicated on a world-wide scale, the inherent tradeoffs between performance and consistency are exaggerated due to the high communication latencies between data centers. The performance difference between reads with different consistencies can be substantial. Strongly consistent reads generally involve multiple replicas or are serviced by a primary site whereas eventually consistent reads can be answered by the closest replica. Even within a data center, the latency of strongly consistent reads has been measured as eight times that of reads with weaker session guarantees. With geo-replication, the performance differences can be more than two orders of magnitude.

SUMMARY

An application programming interface is provided that allows applications to assign multiple service-level agreements to their transactions that read and write data in a replicated cloud storage service. The service-level agreements include latency bounds and consistency guarantees. The applications may further assign utility values to each of the service-level agreements according to their desirability. A monitor component monitors the various replica nodes in a cloud storage service for latency and consistency, and when a transaction is received from an application, the monitor determines which of the replica nodes can likely fulfill the transaction in satisfaction of any of the service-level agreements. Where multiple service-level agreements can be satisfied, the replica node that can fulfill the transaction according to the service-level agreement with the greatest expected utility is selected. The application may be charged for the transaction based on the utility of the service-level agreement that was satisfied.

In an implementation, a service-level agreement is selected by a computing device. A transaction request is generated by the computing device. The generated transaction request and the selected service-level agreement are provided by the computing device. A result associated with the transaction request and an indication that the service-level agreement was complied with are received by the computing device.

In an implementation, a transaction request is received at a computing device. The transaction request includes a plurality of service-level agreements. Information about a plurality of nodes is received at the computing device. Based on the service-level agreements and the information about the nodes, whether the transaction request can be fulfilled in accordance with any of the service-level agreements at one of the nodes is determined by the computing device. If it is determined that the transaction request can be fulfilled in accordance with any of the service-level agreements at one of the nodes, the transaction request is fulfilled according to one or more of the service-level agreements at the node, and an indication that the transaction was fulfilled according to one or more of the service-level agreements at the node is provided by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
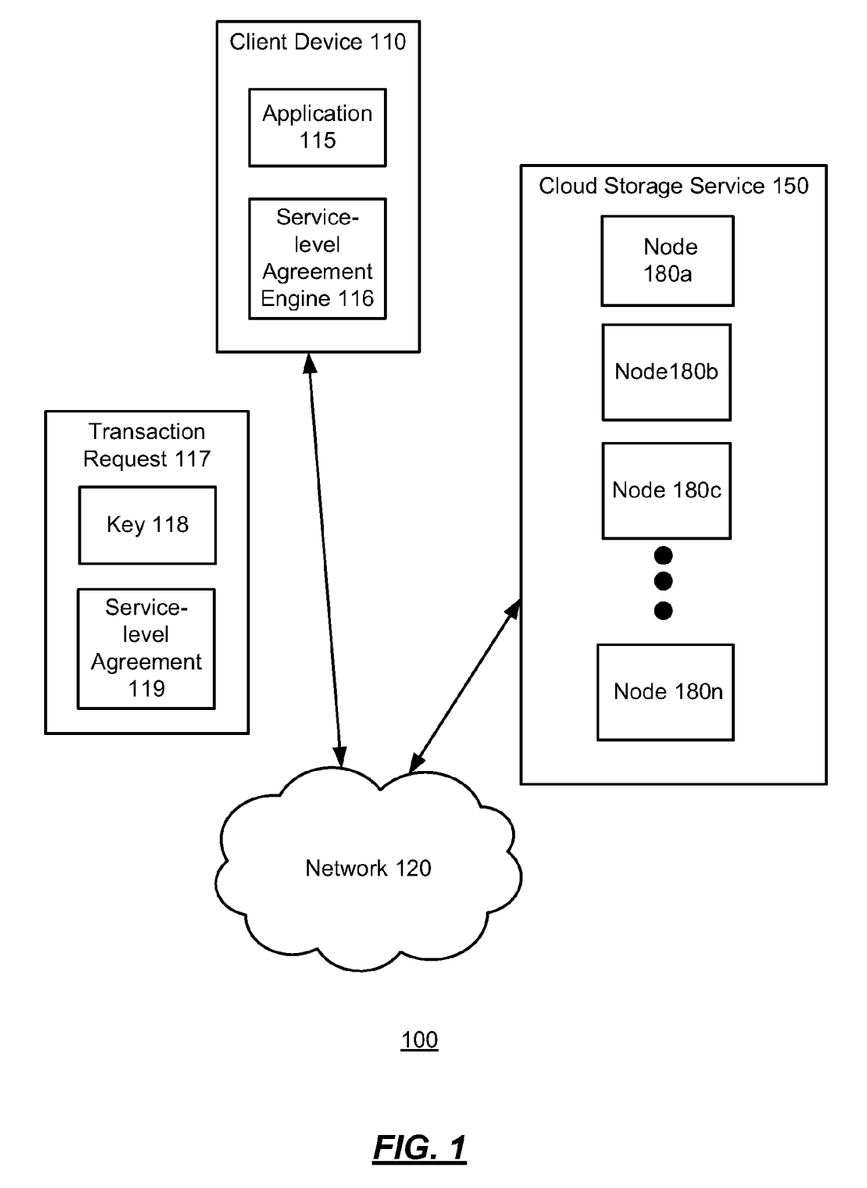
FIG. 1 is an illustration of an example environment for enabling service-level agreements in a cloud storage service.

FIG. 1 is an illustration of an example environment 100 for enabling service-level agreements in a cloud storage service. The environment 100 may include a client device 110 and a cloud storage service 150 in communication with one another through a network 120. The network 120 may be a variety of network types including the public switched telephone network (PSTN), a cellular telephone network, and a packet switched network (e.g., the Internet).

In some implementations, a client device 110 may include a desktop personal computer, workstation, laptop, PDA, smart phone, cell phone, or any WAP-enabled device or any other computing device capable of interfacing directly or indirectly with the network 120. A client device 110 may be implemented using a general purpose computing device such as the computing system 500 illustrated in FIG. 5, for example. While only one client device 110 is shown, it is for illustrative purposes only; there is no limit to the number of client devices 110 that may be supported.

The cloud storage service 150 may provide distributed data storage and data processing services to the client device 110. The cloud storage service 150 may be implemented using a variety of cloud computing systems such as WINDOWS AZURE by MICROSOFT. Other cloud services may be used.

The cloud storage service 150 may include a plurality of computing nodes 180 (i.e., nodes 180a-n). The nodes 180 may provide computation and data storage services to the client devices 110. In particular, the nodes 180 may store one or more data objects for the client devices 110, as well as retrieve data values from stored data objects for the client devices 110. Each of the nodes 180 may be implemented using one or more general purpose computing devices such as the computing system 500. While only four nodes 180 are shown, it is for illustrative purposes only; there is no minimum or maximum number of nodes 180 that may be supported.

The cloud storage service 150 may provide computation and data services to one or more applications 115 executing on the client devices 110. Examples of the applications 115 that may use the cloud storage service 150 may include online shopping applications, e-mail applications, social networking applications, and gaming applications. Other types of applications 115 may be supported.

In some implementations, the cloud storage service 150 may receive and fulfill one or more transaction requests 117 from the applications 115 of the client devices 110. The transaction requests 117 may include put requests and get requests. A put request may be a request to store a data value at a data object, and a get request may be a request to retrieve a stored data value from a data object. A get request may include a key 118 that uniquely identifies the data object that stores the requested data value in the cloud storage service 150. The data value may be read from the identified data object. The data object may be stored at one or more of the nodes 180 in the cloud storage service 150. A series of transaction requests 117 may be grouped together into what is referred to herein as a session.

A put request may have a data value and a key 118 that identifies the data object that the data value may be written to. The data value may be written to the identified data object at one or more of the nodes 180. Where the put request is a request to store a new data value, a data object may be created on one or more of the nodes 180 and the data value may be stored at the new data object. In addition, a key 118 may be assigned to the data object and provided to the application 115 and/or client device 110.

In some implementations, the nodes 180 may be separated into what are referred to as primary nodes and secondary nodes. Each primary node may be associated with a subset of the data objects maintained by the cloud storage service 150. Put requests for data objects that are associated with the primary node are routed to the primary node and fulfilled by the primary node. The primary nodes may periodically push the updates that were made to the data objects to one or more of the secondary nodes. Each secondary node may similarly be associated with a subset of the data objects maintained by the cloud storage service 150. The secondary nodes may push updates received from the primary nodes to other secondary nodes. Get transactions fulfilled from a primary node may be guaranteed to include the most recently updated data values, while get transactions fulfilled from a secondary node may not have the most recently updated data value.

As may be appreciated, each node 180 may be located in a different geographic location, and therefore may have a different latency with respect to the client device 110. For example, a node 180 that is located in the same city as the client device 110 may be able to more quickly fulfill a get transaction request 117 than a node 180 that is located in a different city than the client device 110. Further, because of how the nodes replicate data and the various geographic locations associated with each node 180, the node with the most current data value (i.e., most consistent) for a data object may not be the node with the lowest overall latency.

Different applications 115 may have different requirements or needs with respect to latency and consistency of data values. For example, a video game application may value low latency for data value transactions higher than consistency to reduce lag. Similarly, a banking application may value consistency over low latency.

Accordingly, to help the cloud storage service 150 and/or the application 115 select the most appropriate node 180 to handle a transaction request 117, the client device 110 may further include a service-level agreement engine 116. The service-level agreement engine 116 may allow an application 115 to specify one or more service-level agreements 119 for each transaction request 117 (or session) using an application programming interface. The service-level agreements 119 may specify one or more performance guarantees and/or consistency guarantees.

More specifically, a service-level agreement 119 may specify a latency bound and a consistency guarantee. The latency bound may be a minimum acceptable latency (e.g. 100 ms, 200 ms, 300 ms, etc.), and the consistency guarantee may be a minimum acceptable consistency (e.g., most recent data value, no older than 200 ms, no older than 500 ms, etc.).

The service-level agreement engine 116 may determine which, if any, of the nodes 180 can fulfill a transaction request 117 according to the associated service-level agreement 119 associated with the transaction request 117 using the key 118 and information about each of the nodes 180. The information about each node 180 may include information about the round-trip communication latency of each node 180 with respect to the client device 110, and information about the consistency of the data values stored or maintained by each node 180 (e.g., the latest update times or version numbers of the data objects maintained by the node 180).

If the transaction request 117 can be fulfilled according to the service-level agreement 119, then the service-level agreement engine 116 may fulfill the transaction request 117. Otherwise, the service-level agreement engine 116 may return an error or indication that the service-level agreement engine 116 cannot fulfill the transaction request 117 using the specified service-level agreement 119.

The latency bound of the service-level agreement 119 may specify the latency for the transaction request 117 in milliseconds. In an implementation, the consistency guarantee of the service-level agreement 119 may take one of the following values: strong; eventual; read-my-writes; monotonic; and bounded. Strong may be the highest consistency guarantee and may be fulfilled using the most recent update for a data object. Eventual is less than strong and may be fulfilled with any updated data value for the data object. Read-my-writes may be fulfilled using the most recently updated value for the data object in a current session, or any data value if the data object was not updated in the current session. Monotonic is fulfilled using a same or later data value from a previous get transaction request 117 for the current session, or any data value if no get transactions requests 117 have been fulfilled for the current session. Bounded may include a specified time value t, and may be fulfilled using a data value that was updated no more than t second ago.

In some implementations, an application 115 may specify multiple service-level agreements for a transaction request 117 or session. Where multiple service-level agreements 119 are specified, the service-level agreements may be ranked or ordered according to the desirability of the service-level agreements 119. The service-level agreements 119 may be ranked by the application 115. For example, a first service-level agreement may be the service-level agreement that the application 115 would most like honored, a second service-level agreement may be a less acceptable service-level agreement that may be used if the service-level agreement engine 116 finds that the first service-level agreement cannot, or in not likely to be, honored. Some applications 115 may specify a "catch-all" or unrestricted service-level agreement 119 that allows for all latency and consistency guarantees to prevent a transaction request 117 from failing on account of the service-level agreement engine 116 being unable to honor any of the higher ranked service-level agreements 119.

In some implementations, rather than rank the service-level agreements 119, the application 115 may associate a utility with each of the service-level agreements 119. The service-level agreement engine 116 may then attempt to fulfill the transaction request 117 according to the service-level agreement 119 with the greatest utility.

The utility may further be used to bill or charge applications 115 for the fulfilled transaction requests 117. When a transaction request 117 is fulfilled for a client device 110, the application 115 may be charged an amount of money or fee that is proportional to, or based on, the utility of the service-level agreement 119 that was met by the cloud storage service 150. Such arrangements may allow applications 115 to pay for the levels of latency and consistency that are desired, encourage application designers to consider whether high latency and/or low consistency service-level agreements 119 would be suitable for their applications 115, as well as encourage cloud storage services 150 to fulfill transaction requests 117 according to the service-level agreements 119 with the greatest utility.

Figure 2:
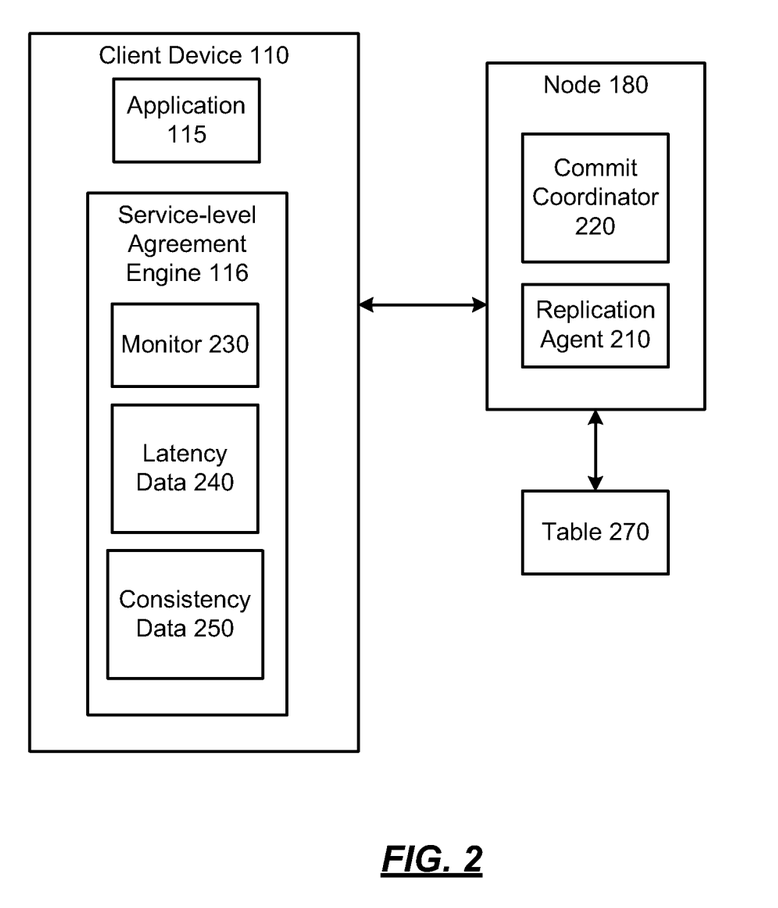
FIG. 2 is an illustration of an example service-level agreement engine and an example node.

FIG. 2 is an illustration of an example service-level agreement engine 116 and an example node 180. As illustrated, the service-level agreement engine 116 includes a monitor 230, latency data 240, and consistency data 250. The node 180 includes a replication agent 210, a commit coordinator 220, and a table 270. More or fewer components may be supported by the service-level agreement engine 116 and/or the node 180.

The commit coordinator 220 of the node 180 may assign timestamps to committed (i.e., fulfilled) transaction requests 117. In particular, the commit coordinator 220 may assign a timestamp to each committed put transaction request 117. In some implementations, the commit coordinator 220 may be part of primary nodes and not secondary nodes. The commit coordinator 220 may further validate transactions 117 before they are committed or written to a data object. Where there are multiple primary nodes, the commit coordinator 220 may ensure that all committed transaction requests 117 are immediately replicated to the other primary nodes.

The replication agent 210 may control the propagation of data values and data objects between the nodes 180. In particular, the replication agent 210 may ensure that the data object updates associated with the put transaction requests 117 that are made by the primary nodes are eventually also applied by each of the secondary nodes. The updates may be applied by each secondary node in order of the timestamps associated with each transaction request 117. Any system, method, or technique known in the art for the replication of data between nodes 180 may be used. One example of a replication technique that may be used is a gossip protocol.

The replication agent 210 may store data objects in the table 270. The table 270 may be implemented using a variety of data structures and may include the keys 118 corresponding to each data object and the most recent data value associated with the data object. Each data object may also have an associated timestamp which is the timestamp associated with the most recent transaction request 117 that the node 180 is aware of for that data object (i.e., the timestamp assigned by the commit coordinator 220).

In some implementations, the replication agent 210 may maintain previous versions of one or more data objects. Each version may be associated with a different timestamp. The highest timestamp that the replication agent 210 is aware of is known as the high timestamp for the node 180.

The replication agent 210 may periodically prune or delete older versions of data objects from the table 270. The date of the last pruning performed by the replication agent 210 is known as the low time stamp for the node 180. Any system, method, or technique for pruning data objects from a table 270 may be used.

With respect to nodes 180 that are primary nodes, the replication agent 210 may periodically transmit null transactions along with a current time to one or more of the other nodes 180 if a transaction request 117 has not been committed by the commit coordinator 220 for a period of time. The replication agents 210 at the receiving nodes 180 may then update their high timestamp to the current time associated with the null transaction. As described further below, by updating the high timestamps of the nodes 180 the service-level agreement engine 116 may learn which nodes 180 include up-to-date data values in their tables 270.

The monitor 230 of the service-level agreement engine 116 may collect information from each of the nodes 180, and may store the collected information as the latency data 240 and the consistency data 250. The collected information about the nodes 180 may be used by the service-level agreement engine 116 to determine if a transaction request 117 can be fulfilled according to the one or more service-level agreements 119 at one or more of the nodes 180.

In some implementations, the monitor 230 may determine the information by periodically contacting each of the nodes 180. For example, the monitor 230 may periodically ping each node 180. Alternatively, each of the nodes 180 may periodically provide the information to the monitor 230. The information may be used by the monitor 230 to determine the latency data 240 and the consistency data 250. In some implementations, the information may also include the ranges of keys 118 that correspond to the data objects that are stored in the tables 270 of each node 180.

With respect to the consistency data 250, the information provided by the node 180 may include the high timestamp of the node 180 and the low time stamp of the node 180 as determined by the replication agent 210. The high and low timestamps may be stored as the consistency data 250. The window of time defined by the high and low timestamps may be used by the service-level agreement engine 116 to determine the consistency of the data objects in the table 270 of the particular node 180.

With respect to the latency data 240, the information provided by the node 180 may include a measured latency between the client device 110 and the node 180. For example, the node 180 may periodically measure the latency between it and the client device 110. Alternatively or additionally, the monitor 230 may determine the latency between the client device 110 and the node 180 by requesting the consistency data 250 from the node 180, and based on the amount of time that elapses before the requested data is received (i.e., round trip time), may determine the latency between the client device 110 and the node 180. Because the observed latency may be skewed by a variety of factors including temporary network congestion or high processing loads of the nodes 180, in some implementations, the latency data 240 for a node 180 may be an average latency of some number of previously observed latencies.

The service-level agreement engine 116 may use the latency data 240 and the consistency data 250 to determine which if any of the nodes 180 can fulfill a transaction request 117 according to a service-level agreement 119. As described above, a service-level agreement 119 may include a latency bound and a consistency guarantee. With respect to the latency bound, the service-level agreement engine 116 may determine if a node 180 can fulfill a transaction request 117 within the latency bound based on the latency data 240. The service-level agreement engine 116 may determine that the node 180 can fulfill the transaction request 117 within the latency bound of the service-level agreement 119 based on the latency data 240 if the latency bound is greater than the latency data 240 for the node 180.

In some implementations, the service-level agreement engine 116 may determine a probability that the node 180 can fulfill a transaction request 117 (or all transaction requests 117 associated with a session) within the latency bound based on the latency data 240. For example, as described above, the latency data 240 may have multiple observed latencies for the nodes 180 over a period of time. The service-level agreement engine 116 may then determine the probability by comparing the latency bound with each of the observed latencies. In some implementations, the probability calculation may be weighted to favor more recent observed latencies.

With respect to the consistency guarantee, the service-level agreement engine 116 may determine if node 180 can fulfill a transaction request 117 (or all transaction requests 117 associated with a session) according to the consistency guarantee based on the consistency data 250. How the service-level agreement engine 116 determines if the consistency guarantee can be met may depend on the consistency guarantee selected by the application 115.

In some implementations, for purposes of determining if a consistency guarantee is met, the service-level agreement engine 116 may determine one or more acceptable read timestamps for the transaction request 117. The read timestamps for a transaction request 117 may be determined based on the consistency guarantee selected for the transaction request 117, the data objects that were read and written in any previous transaction requests associated with a current session, and the key(s) 118 associated with the transaction request 117. The service-level agreement engine 116 may determine the probability that the node 180 can fulfill the transaction request according to the selected consistency guarantee based on the acceptable read timestamps and the range of timestamps between the high and low timestamps associated with the node 180.

For the strong consistency guarantee to be met, the read timestamp must be at least as large as the commit timestamps of put operations using any of the keys 118 associated with get operations in the transaction request 117. This guarantees that each get operation accesses the latest version of the data object that existed at the start of the transaction associated with the request 117. Thus, the low-end of the acceptable timestamp range is the maximum timestamp of all versions stored at primary nodes 180 for the keys 118 associated with the transaction request 117.

For read-my-writes consistency guarantees, a session state of the client device 110 may record a commit timestamp of any previous transactions in a session that performed put operations. The low-end of the read timestamp range may be the maximum timestamp of any previously committed put operations associated with keys 118 being accessed in the current transaction.

For monotonic reads consistency guarantees, the session state of the client device 110 may record the timestamps and keys 118 of all data objects with values returned by previous get operations. The read timestamp may be at least as large as the maximum recorded timestamp for any keys 118 accessed in the transaction.

For bounded staleness consistency guarantees, the smallest acceptable read timestamp may be the current time minus the desired time bound. Client devices 110 and nodes 180 may have approximately synchronized clocks.

For eventual consistency guarantees, any read timestamp may be acceptable. However, reading from time zero, while technically not a violation of the consistency guarantee, may be ineffective for applications 115. Choosing the current time may not be acceptable since it has the same effect as choosing strong consistency with the same limitations on performance and availability.

For any consistency guarantee (except strong), there may be a trade-off in selecting a read timestamp from the acceptable range: choosing more recent times produces more recent data, which applications 115 desire, but choosing older times results in a broader set of nodes 180 that can potentially meet the consistency guarantee, thereby increasing the likelihood of meeting a given service-level agreement 119. Any method or technique for choosing a read timestamp may be used.

Computing the acceptable timestamp range for many of the consistency guarantees may include the service-level agreement engine 116 determining, at the start of the transaction, the set of get operations that are associated with the current session or transaction request 117. In some cases, determining the set of keys 118 being accessed may be impractical, such as when the key 118 for a get operation depends on user input or data retrieved in some prior get operation within the same transaction. For such transactions, the service-level agreement engine 116 may obtain a conservative time range by assuming that every data object will be read (i.e., a get operation). For strong consistency gets operations, for example, the service-level agreement engine 116 may obtain the timestamp of the latest commit from every primary node 180.

The service-level agreement engine 116 may determine if a service-level agreement 119 for a transaction request 117 can be met by a node 180 if both of the latency bound and the consistency guarantee can be met by the node 180. Alternatively, the service-level agreement engine 116 may determine a probability that a service-level agreement 119 for a transaction request 117 can be met by a node 180 by multiplying the determined probability that the latency bound can be met by the node 180 with the determined probability that the consistency guarantee can be met by the node 180.

Where multiple service-level agreements 119 for a transaction request 117 may be met by one or more nodes 180, the service-level agreement engine 116 may select which service-level agreement 119 and node 180 to use to fulfill the transaction request 117. In some implementations, the service-level agreement engine 116 may select the service-level agreement 119 with the greatest utility or that has the greatest associated rank. Where multiple nodes 180 meet the selected service-level agreement 119, the service-level agreement engine 116 may select the node 180 with the lowest overall associated latency. Alternatively or additionally, the service-level agreement engine 116 may randomly select the node 180, or may select the node 180 using a load balancing algorithm. Other methods for selecting a node 180 may be used.

In implementations where each service-level agreement 119 is associated with a utility value, the service-level agreement engine 116 may select a node 180 to fulfill a transaction request 117 using an expected value function. The service-level agreement engine 116 may then select the node 180 that can fulfill the transaction request 117 with the highest expected value.

For example, the service-level agreement engine 116 may, for each node 180, calculate the expected value for each service-level agreement 119 for the node 180 by multiplying the probability that the node 180 can fulfill the service-level agreement 119 by the utility associated the service-level agreement 119. The node 180 that can fulfill a service-level agreement 119 for the transaction request 117 with the highest calculated expected value may be selected by the service-level agreement engine 116.

After selecting the node 180 to fulfill the transaction request 117, the service-level agreement engine 116 may provide the transaction request to the selected node 180. The node 180 may then fulfill the request 117, and the node 180 may send an indication or confirmation that the transaction 117 was fulfilled to the service-level agreement engine 116. Where the transaction request 117 is a get transaction request 117, the confirmation may include the data value that was read from the data object corresponding to the key 118.

In some implementations, the confirmation may include information that the service-level agreement engine 116 can use to determine which of the service-level agreements 119 were met by the fulfillment of the transaction request 117. For example, the information may include the actual timestamp of the data object used in the transaction request 117, and or the actual observed latency associated with the fulfillment of the transaction request 117. As may be appreciated, because the latency data 240 and/or the consistency data 250 of the monitor 230 may not be up to date, the actual service-level agreement 119 that is fulfilled by the node 180 may be different than the service-level agreement 119 that the service-level agreement engine 116 predicted would be fulfilled by the node 180. Accordingly, the service-level agreement engine 116 may determine which of the service-level agreements 119 were actually fulfilled for the transaction request 117.

The service-level agreement engine 119 may confirm to the application 115 that the transaction request 117 was fulfilled and may include any data value(s) or key(s) generated as a result of the transaction request 117. The confirmation may include the service-level agreement 119 that was determined to have been fulfilled. The service-level agreement engine 119 may further charge or bill the application 115 based on the utility of the service-level agreement 119 that was fulfilled.

Figure 3:
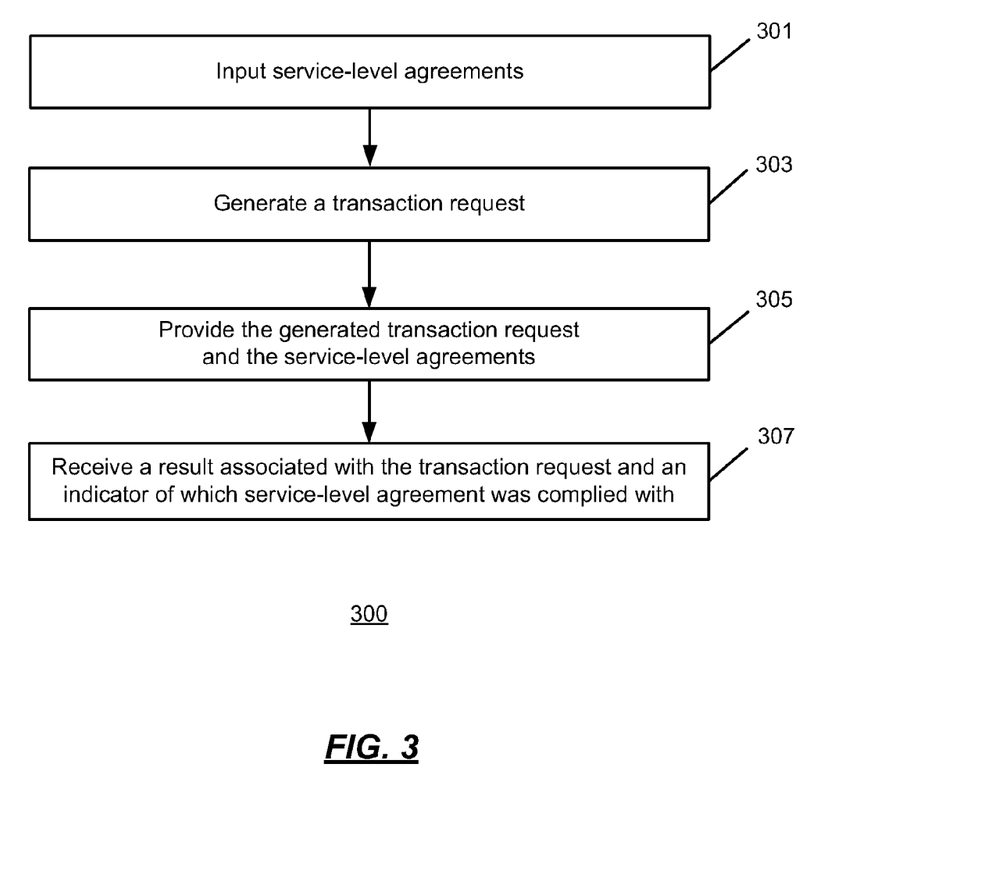
FIG. 3 is an operational flow of an implementation of a method for providing a transaction request and a plurality of service-level agreements to a cloud storage service.

FIG. 3 is an operational flow of an implementation of a method 300 for providing a transaction request and a plurality of service-level agreements to a cloud storage service. The method 300 may be implemented by the application 115 of a client device 110, for example.

A plurality of service-level agreements is input at 301. The plurality of service-level agreements 119 may be provided by the application 115 of the client device 110. In some implementations, each service-level agreement 119 may have a latency bound and a consistency guarantee. In addition, each service-level agreement 119 may have an associated utility value. A user or operator associated with the application 115 may select or input the plurality of service-level agreements 119 using an application programming interface, for example.

A transaction request is generated at 303. The transaction request 117 may be generated by the application 115 of the client device 110. The transaction request 117 may be one or more put or get requests. A put request may be a request to write a data value to a data object, and a get request may be a request to read a data value from a data object. Other transaction requests may be supported. The transaction request 117 may include one or more keys 118 that identify the data objects being accessed.

The generated transaction request and the plurality of service-level agreements are provided at 305. The generated transaction request 117 and the plurality of service-level agreements 119 may be provided by the application 115 to the service-level agreement engine 116. The engine 116 may then select one of a plurality of nodes 180 of the cloud storage service 150 to fulfill the request according to one of the service-level agreements 119.

A result associated with the transaction request is received at 307. The result may be received by the application 115 from the service-level agreement engine 116. For put transaction requests 117, the result may be a confirmation that the data value was stored for the data object. For get transaction requests 117, the result may include a data value that was retrieved from the data object. The result may further have an indicator of which service-level agreement 119 of the plurality of service-level agreements 119 were complied with by the cloud storage service 150. A service-level agreement is complied with if the transaction request 117 was fulfilled in according with both the latency bound and the consistency guarantee of the service-level agreement.

Figure 4:
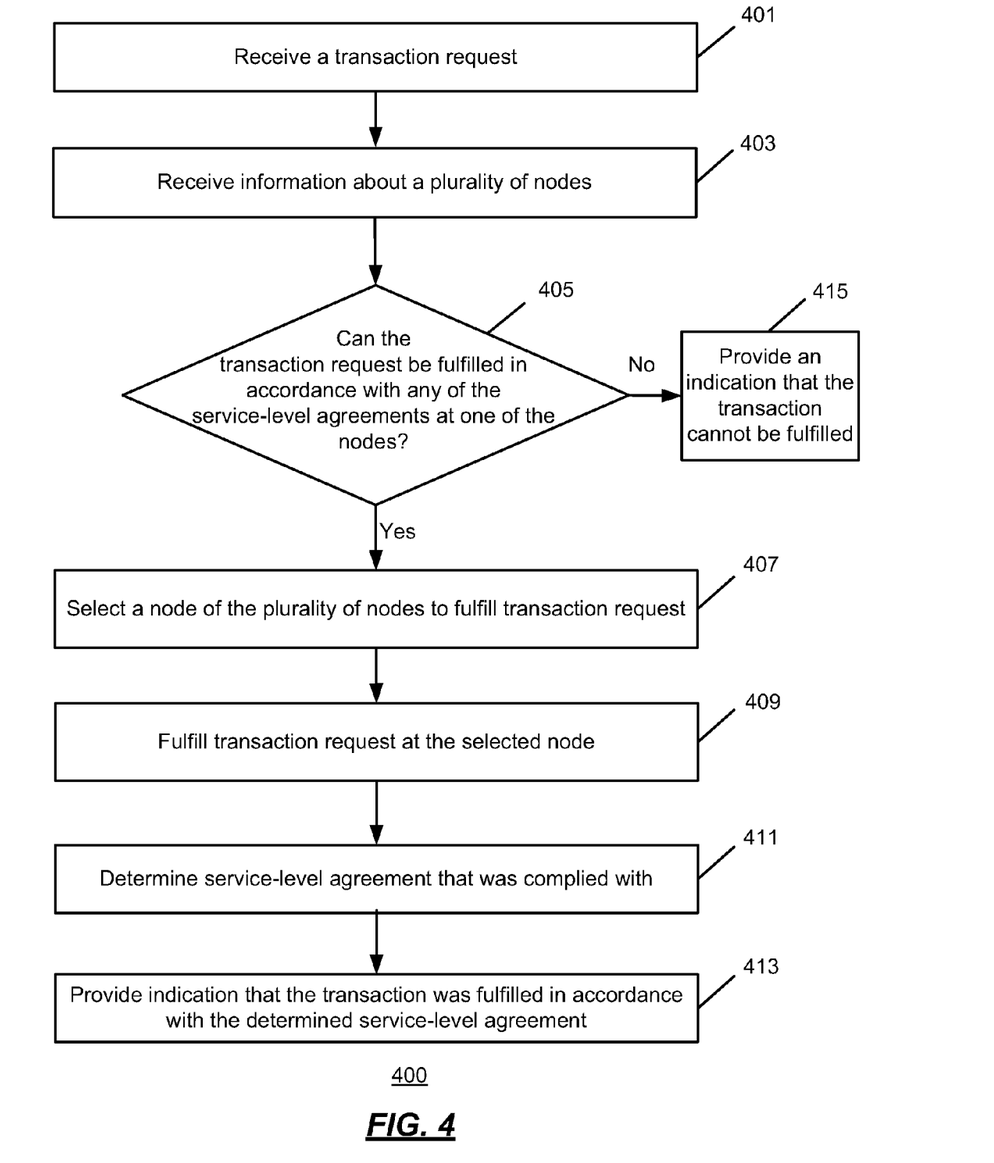
FIG. 4 is an operational flow of an implementation of a method for fulfilling a transaction request in accordance with a plurality of service-level agreements.

FIG. 4 is an operational flow of an implementation of a method 400 for fulfilling a transaction request 117 in accordance with a plurality of service-level agreements 119. The method 400 may be implemented by the service-level agreement engine 116 and/or the cloud storage service 150, for example.

A transaction request is received at 401. The transaction request 117 may be received by the service-level agreement engine 116 from the application 115 of the client device 110. The transaction request 117 may be associated with a plurality of service-level agreements 119, and each service-level agreement may include a latency bound and a consistency guarantee. In addition, each service-level agreement may have an associated utility.

Information about a plurality of nodes is received at 403. The information about the plurality of nodes 180 may be received by the monitor 230 of the service-level agreement engine 116. The information may include timestamps (i.e., a high timestamp and a low timestamp) from each of the nodes 180. The timestamps may be used by the monitor 230 to determine consistency data 250 regarding each of the plurality of nodes 180. The information may further include latency information such as a roundtrip time between the client device 110 and each of the plurality of nodes 180. The latency information may be used by the monitor 230 to determine latency data 240 regarding each of the plurality of nodes 180.

Whether the transaction request can be fulfilled in accordance with any of the plurality of service-level agreements at one of the plurality of nodes is determined at 405. The determination may be made by the service-level agreement engine 116 using the latency data 240 and the consistency data 250. In some implementations, the service-level agreement engine 116 may make the determination by, for each node 180 and service-level agreement 119, determining if the average latency for the node is less than the latency bound in the service-level agreement 119 and the timestamps associated with the node 180 are in accordance with the consistency level of the service-level agreement 119. For example, if the consistency level is strong, then the timestamps may be in accordance with the consistency level if the high time stamp for the node 180 is equal to the highest timestamp known by the service-level agreement engine 116.

If the transaction request can be fulfilled in accordance with any of the service-level agreements, then the method 400 may continue at 407. Otherwise, the method may continue at 415 where an indication is provided that the transaction cannot be fulfilled.

A node of the plurality of node is selected to fulfill the transaction request at 407. The node 180 may be selected by the service-level agreement engine 116. Where multiple nodes 180 are able to satisfy one or more of the service-level agreements 119, the service-level agreement engine 116 may select a node 180 to fulfill the transaction. In some implementations, the engine 116 may select the node 180 that can fulfill the transaction 117 according to the service-level agreement with the highest utility.

In other implementations, the service-level agreement engine 116, for each node 180 and service-level agreement 119, may determine a probability that the node 180 can fulfill the transaction 117 according to the service-level agreement 119. The service-level agreement engine 116 may then determine an expected utility for the node 180 and service-level agreement 119 by multiplying the determined probability by the utility associated with the service-level agreement 119. The node associated with the greatest determined expected utility may be selected.

For example, in some implementations, at the start of a transaction 117, for each service-level agreement 119 and each node 118 storing a key 118 that is accessed in the transaction 117, the service-level agreement engine 116 may compute the expected utility that would accrue from performing the get operations at that node 118. This expected utility may be the product of the probability that the node 118 can fulfill the get operations according to the service-level agreement 119 and the utility associated with the service-level agreement 119. The service-level agreement engine 116 may record the best node 180 for each key 118/service-level agreement 119 pair; if multiple nodes 180 offer the same expected utility, the service-level agreement engine 116 may choose one at random to balance the load or pick the one that is most up-to-date or closest. The service-level agreement engine 116 may then compute the total expected utility for each service-level agreement 119 by summing over the best nodes 180 for all keys 118. The service-level agreement engine 116 may then choose the service-level agreement 119 and node 180 with the highest expected utility.

The transaction request is fulfilled at the selected node at 409. The transaction request 117 may be fulfilled by the selected node 180 of the cloud storage service 150. The transaction request 117 may be fulfilled by either storing or retrieving a data value in the table 270 associated with the selected node 180.

The service-level agreement that was complied with is determined at 411. The service-level agreement 119 may be determined by the service-level agreement engine 116. The service-level agreement 119 may be determined by determining the actual consistency guarantee that was met by the node 180 and the actual latency associated with performing the transaction. The service-level agreement engine 116 may then determine the service-level agreement 119 with highest rank or utility that was achieved based on the actual consistency and latency bounds of the completed transaction.

An indication that the transaction request was fulfilled in accordance with the determined service-level agreement is provided at 413. The indication may be provided to the application 115 by the service-level agreement engine 116. The indication may also include any data values retrieved by the selected node 180 from the transaction request 117.

Figure 5:
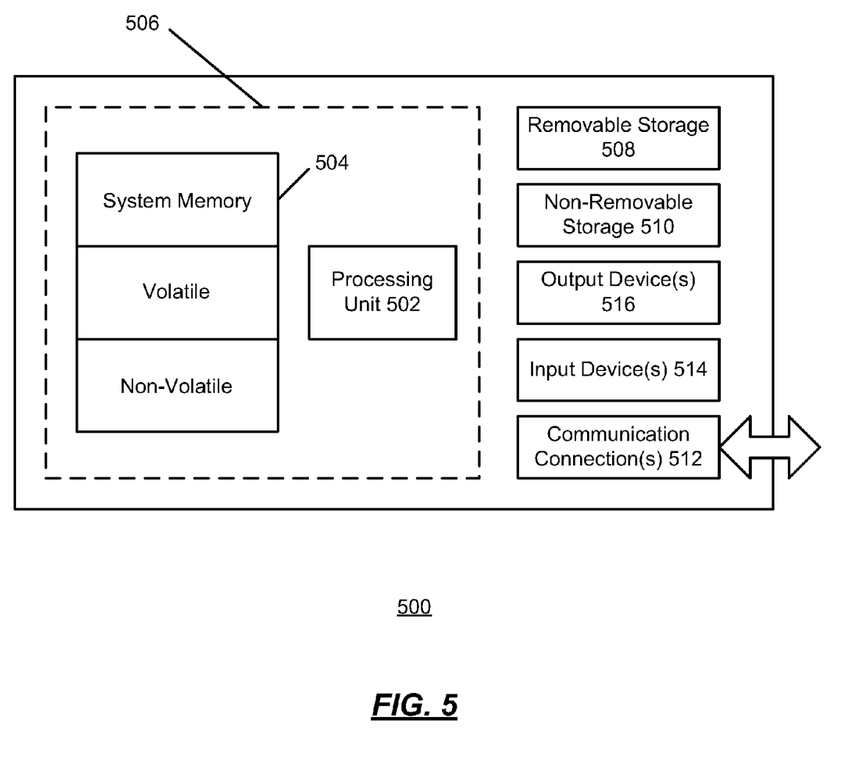
FIG. 5 is a block diagram of a computing system environment according to an implementation of the provided system.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing system 500. In its most basic configuration, computing system 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing system 500 may have additional features/functionality. For example, computing system 500 may include additional storage (removable and/or non-removable) including, but not limited to, magnetic or optical disks or tape. Such additional storage is illustrated in FIG. 5 by removable storage 508 and non-removable storage 510.

Computing system 500 typically includes a variety of computer readable media. Computer readable media can be any available media that can be accessed by computing system 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 500. Any such computer storage media may be part of computing system 500.

Computing system 500 may contain communication connection(s) 512 that allow the device to communicate with other devices. Computing system 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   selecting a plurality of service-level agreements by a computing device, wherein each service level agreement comprises a consistency guarantee;
   assigning a utility of each of the selected service-level agreements by the computing device;
   generating a transaction request by the computing device;
   providing the generated transaction request and the selected service-level agreement to a cloud storage service by the computing device; and
   receiving a result associated with the transaction request and an indication of which service-level agreement of the selected service-level agreements was complied with from the cloud storage service by the computing device.

2. The method of claim 1, wherein each service-level agreement further comprises a performance guarantee, and selecting each service-level agreement comprises selecting the consistency guarantee and the performance guarantee.

3. The method of claim 1, wherein each consistency guarantee comprises one or more of strong, eventual, monotonic, read-my-writes, or bounded staleness.

4. The method of claim 1, wherein the transaction request includes one or more put or get operations.

5. A method comprising:
   receiving a transaction request at a computing device, wherein the transaction request comprises a plurality of service-level agreements and each service level agreement comprises a consistency guarantee and each service level agreement is associated with a utility;
   receiving information about a plurality of nodes at the computing device;
   determining, based on the plurality of service-level agreements and the information about the plurality of nodes, whether the transaction request can be fulfilled in accordance with any of the plurality of service-level agreements at one of the plurality of nodes by the computing device; and
   if the transaction request can be fulfilled in accordance with any of the plurality of service-level agreements at one of the plurality of nodes:
      fulfilling the transaction request according to one or more of the plurality of service-level agreements at the one of the plurality of nodes by the computing device; and
      providing an indication that the transaction was fulfilled according to one or more of the plurality of service-level agreements at the one of the plurality of nodes by the computing device.

6. The method of claim 5, further comprising:
   if the transaction request cannot be fulfilled in accordance with any of the plurality of service-level agreements, providing an indication that the transaction request cannot be fulfilled in according to any of the plurality of service-level agreements.

7. The method of claim 5, wherein fulfilling the transaction request according to one or more of the plurality of service-level agreements comprises:
   determining the service-level agreement with a greatest expected utility that can be used to fulfill the service-level agreement at one of the plurality of nodes; and
   fulfilling the transaction request according to the determined service-level agreement at the one of the plurality of nodes.

8. The method of claim 7, further comprising charging a fee based on the utility associated with the determined service-level agreement.

9. The method of claim 5, wherein the transaction request comprises a set of keys and each of the plurality service-level agreements further comprises a latency bound, and determining, based on the plurality of service-level agreements and the information about the plurality of nodes, whether the transaction request can be fulfilled in accordance with any of the plurality of service-level agreements further comprises, for each of the plurality of service-level agreements:
   determining an average latency associated with a node of the plurality of nodes that is associated with the keys based on the information about the plurality of nodes;
   determining if the average latency is less than the latency bound of the service-level agreement; and
   if the average latency is less than the latency bound, determining that the transaction request can be fulfilled in accordance with the service-level agreement.

10. The method of claim 7, wherein determining, based on the plurality of service-level agreements, whether the transaction request can be fulfilled in accordance with any of the plurality of service-level agreements comprises, for each of the plurality of service-level agreements:
   determining a timestamp of the node of the plurality of nodes that is associated with the keys based on the information about the plurality of nodes;
   determining if the consistency guarantee is in accordance with the timestamp; and
   if the consistency guarantee is in accordance with the timestamp, determining that the transaction request can be fulfilled in accordance with the service-level agreement.

11. The method of claim 10, wherein the consistency guarantee is one or more of one or more of strong, eventual, monotonic, read-my-writes, or bounded staleness.

12. The method of claim 5, wherein the transaction request is one or more put or get operations.

13. A system comprising:
at least one computing device;
a storage service comprising a plurality of nodes;
an application adapted to generate a transaction request, wherein the transaction request includes a plurality of service-level agreements, and each service-level agreement is associated with a utility and each service-level agreement comprises a consistency guarantee; and
a service-level agreement engine adapted to:
receive the transaction request;
select a node of the plurality of nodes that can fulfill the transaction request in accordance with one or more of the plurality of service-level agreements based on the utilities associated with each of the plurality of service-level agreements and the consistency guarantee of each of the plurality of service-level agreements; and
fulfill the transaction request from the selected node.

14. The system of claim 13, wherein each service-level agreement further comprises a latency bound.

15. The system of claim 13, wherein selecting a node of the plurality of nodes that can fulfill the transaction request in accordance with one or more of the plurality of service-level agreements based on the utilities associated with each of the plurality of service-level agreements and the consistency guarantee of each of the plurality of service-level agreements comprises:
for each node and service-level agreement:
determining a probability that the node can fulfill the transaction request in accordance with the consistency guarantee of the service-level agreement; and
determining an expected value for the node and the service-level agreement based on the determined probability and the utility; and
selecting the node associated with the greatest determined expected value.

16. The system of claim 13, wherein the transaction request is for one or more put or get operations.

17. The system of claim 13, wherein each consistency guarantee is one or more of one or more of strong, eventual, monotonic, read-my-writes, or bounded staleness.

* * * * *